(12) United States Patent
Bluzer et al.

(10) Patent No.: US 12,008,806 B2
(45) Date of Patent: Jun. 11, 2024

(54) METHODS AND SYSTEMS TO ALLOW THREE-DIMENSIONAL MAP SHARING BETWEEN HETEROGENEOUS COMPUTING SYSTEMS, CROSS-LOCALIZATION, AND SHARING CONTENT IN THREE-DIMENSIONAL SPACE

(71) Applicant: Meta Platforms Technologies, LLC, Menlo Park, CA (US)

(72) Inventors: Evyatar Bluzer, Givatayim (IL); Elad Joseph, Atlit (IL); Ezri Joseph Sonn, Mitzpe Ilan (IL); Shanghsuan Tsai, Sunnyvale, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 415 days.

(21) Appl. No.: 17/406,399

(22) Filed: Aug. 19, 2021

(65) Prior Publication Data
US 2023/0058154 A1 Feb. 23, 2023

(51) Int. Cl.
*G06V 20/10* (2022.01)
*G06V 10/40* (2022.01)

(52) U.S. Cl.
CPC .............. *G06V 20/10* (2022.01); *G06V 10/40* (2022.01)

(58) Field of Classification Search
CPC ..... G06T 19/006; G06T 19/00; G06T 19/003; G06T 15/08; G06F 3/011; G06F 3/04815;
(Continued)

(56) References Cited

U.S. PATENT DOCUMENTS

| 9,964,409 B1 | 5/2018 | Flint et al. |
| 10,338,392 B2 | 7/2019 | Kohler et al. |

(Continued)

FOREIGN PATENT DOCUMENTS

| EP | 3419286 A1 | 12/2018 |
| WO | 2013155217 A1 | 10/2013 |

(Continued)

OTHER PUBLICATIONS

International Search Report and Written Opinion for International Application No. PCT/US2020/027763, mailed Jul. 23, 2020, 12 Pages.

(Continued)

*Primary Examiner* — Kathleen Y Dulaney
(74) *Attorney, Agent, or Firm* — Potomac Law Group, PLLC; Dannon G. Allbee

(57) ABSTRACT

A method includes a computing system associated with a first artificial-reality device accessing sensor data of a real environment, generating a first plurality of feature descriptors for the real environment, and generating a second plurality of feature descriptors for the real environment based on the first plurality of feature descriptors, wherein the second plurality of feature descriptors have lower detail than the first plurality of feature descriptors. The computing system may further cause the first plurality of feature descriptors to be transmitted using a wireless connection, wherein the transmitted first plurality of feature descriptors are configured to be converted into a third plurality of feature descriptors different from the second plurality of feature descriptors. The third plurality of feature descriptors are configured to be used by a second artificial-reality device for tracking the real environment. The computing system tracks the real environment using the second plurality of feature descriptors.

20 Claims, 9 Drawing Sheets

(58) Field of Classification Search
CPC .......... G06F 9/50; G06V 20/20; G06V 20/10;
G06V 10/40; G06V 10/46; G06V 10/62;
H04L 12/1827; H04L 67/131; G05B
2219/40126
USPC .................................. 382/103; 345/419, 633
See application file for complete search history.

(56) References Cited

U.S. PATENT DOCUMENTS

| | | | |
|---|---|---|---|
| 10,346,623 | B1 | 7/2019 | Brandwine et al. |
| 10,466,953 | B2* | 11/2019 | Eade ...................... G06F 3/147 |
| 10,657,701 | B2 | 5/2020 | Osman et al. |
| 10,740,613 | B1* | 8/2020 | Sinclair ................. G06T 1/0021 |
| 11,847,748 | B2* | 12/2023 | Liu ...................... G06F 3/04845 |
| 2005/0249426 | A1 | 11/2005 | Badawy |
| 2014/0267234 | A1* | 9/2014 | Hook .................... G06T 19/006 345/419 |
| 2016/0364912 | A1 | 12/2016 | Cho et al. |
| 2017/0053442 | A1* | 2/2017 | Sumner ................ G06T 19/006 |
| 2017/0243403 | A1* | 8/2017 | Daniels ................ G06T 19/006 |
| 2017/0337749 | A1* | 11/2017 | Nerurkar ................ G06F 3/017 |
| 2017/0345167 | A1 | 11/2017 | Ard et al. |
| 2018/0053329 | A1 | 2/2018 | Roberts et al. |
| 2018/0122139 | A1 | 5/2018 | Janzer et al. |
| 2018/0144547 | A1 | 5/2018 | Shakib et al. |
| 2018/0232937 | A1 | 8/2018 | Moyer et al. |
| 2019/0197339 | A1* | 6/2019 | Han ................. H04N 21/44008 |
| 2019/0236842 | A1 | 8/2019 | Bennett et al. |
| 2019/0287311 | A1* | 9/2019 | Bhatnagar ............. G06T 15/08 |
| 2019/0340836 | A1* | 11/2019 | Lynen .................. G06T 19/006 |
| 2019/0370994 | A1* | 12/2019 | Norris ................... G06V 20/20 |
| 2020/0066046 | A1* | 2/2020 | Stahl ..................... G06T 19/006 |
| 2020/0099954 | A1 | 3/2020 | Hemmer et al. |
| 2020/0175764 | A1* | 6/2020 | Romea .................... G06T 7/73 |
| 2020/0250879 | A1 | 8/2020 | Foster et al. |
| 2020/0364901 | A1 | 11/2020 | Choudhuri et al. |
| 2021/0056762 | A1 | 2/2021 | Robbe et al. |
| 2021/0304509 | A1 | 9/2021 | Berkebile |
| 2022/0043446 | A1 | 2/2022 | Ding et al. |
| 2022/0254207 | A1 | 8/2022 | Billy et al. |
| 2022/0392104 | A1* | 12/2022 | Zeng ...................... G06F 3/012 |

FOREIGN PATENT DOCUMENTS

| | | |
|---|---|---|
| WO | 2015192117 A1 | 12/2015 |
| WO | 2021010660 A1 | 1/2021 |
| WO | 2021188741 A1 | 9/2021 |

OTHER PUBLICATIONS

Balntas V., et al., "HPatches: A Benchmark and Evaluation of Handcrafted and Learned Local Descriptors," Computer Vision and Pattern Recognition (CVPR), Apr. 19, 2017, arXiv:1704.05939v1 [cs.CV], 10 Pages.

Mur-Artal R., et al., "ORB-SLAM: a Versatile and Accurate Monocular SLAM System," IEEE Transactions on Robotics, Sep. 18, 2015, arXiv:1502.00956v2 [cs.RO], 18 Pages, DOI: 10.1109/TRO.2015.2463671.

Tian Y., et al., "SOSNet: Second Order Similarity Regularization for Local Descriptor Learning," Computer Vision and Pattern Recognition (CVPR), Dec. 16, 2019, arXiv:1904.05019v2 [cs.CV], 10 Pages.

International Search Report and Written Opinion for International Application No. PCT/US2022/052472, mailed Apr. 17, 2023, 11 pages.

International Search Report and Written Opinion for International Application No. PCT/US2023/011579, mailed May 17, 2023, 12 pages.

Morrison J. G., et al., "Scalable Multirobot Localization and Mapping with Relative Maps: Introducing MOARSLAM," IEEE Control Systems, vol. 36, No. 2, Apr. 1, 2016, pp. 75-85.

\* cited by examiner

METHODS AND SYSTEMS TO ALLOW THREE-DIMENSIONAL MAP SHARING BETWEEN HETEROGENEOUS COMPUTING SYSTEMS, CROSS-LOCALIZATION, AND SHARING CONTENT IN THREE-DIMENSIONAL SPACE

TECHNICAL FIELD

This disclosure generally relates to facilitating access to three-dimensional maps.

BACKGROUND

Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

A mobile computing device—such as a smartphone, tablet computer, or laptop computer—may include functionality for determining its location, direction, or orientation, such as a GPS receiver, compass, gyroscope, or accelerometer. Such a device may also include functionality for wireless communication, such as BLUETOOTH communication, near-field communication (NFC), or infrared (IR) communication or communication with a wireless local area networks (WLANs) or cellular-telephone network. Such a device may also include one or more cameras, scanners, touchscreens, microphones, or speakers. Mobile computing devices may also execute software applications, such as games, web browsers, or social-networking applications. With social-networking applications, users may connect, communicate, and share information with other users in their social networks.

SUMMARY OF PARTICULAR EMBODIMENTS

Disclosed methods provide techniques for sharing three-dimensional map data between heterogenous devices. Disclosed methods permit computing systems associated with artificial-reality devices to generate map data, for example feature descriptors, using a machine-learning model and sensor data accessed by the computing system. Using these generated feature descriptors, the artificial-reality device can generate a second plurality of feature descriptors based on the first plurality of feature descriptors. The second plurality of feature descriptors may have lower detail relative to the first feature descriptors. The second feature descriptors may have a level of detail that is particular to a specific artificial-reality device (e.g., high detail feature descriptors for a high-performant artificial-reality device, low detail feature descriptors for a lesser-performant artificial-reality device, etc.). The second plurality of feature descriptors can then be utilized by the artificial-reality device for various functionality, for example and not by way of limitation, map localization and tracking. The artificial-reality device can also share the first plurality of feature descriptors with other devices, for example a second artificial reality device or a server, which can be utilized to generate a third plurality of feature descriptors. This technique permits every artificial-reality device, regardless of capability, to generate and share feature descriptors, while simultaneously providing device-specific feature descriptors that can be used for localization and tracking by the particular artificial-reality device, thus optimizing the capabilities of a particular artificial-reality device.

In particular embodiments, the map data may be generated and shared by one or more components (e.g., CPU, GPU, etc.) of a computing system associated with a device (e.g., a laptop, a cellphone, a desktop, a wearable device). In particular embodiments, the device is in communication with a computing system on the HMD but may be otherwise physically separated from the HMD. As an example and not by way of limitation, this device may be a laptop device that is wired to the HMD or communicates wirelessly with the HMD. As another example and not by way of limitation, the device may be a wearable (e.g., a device strapped to a wrist), handheld device (e.g., a phone), or some other suitable device (e.g., a laptop, a tablet, a desktop) that is wired to the HMD or communicates wirelessly with the HMD. As another example and not by way of limitation, an onboard computing system of an HMD may generate and share the map data between one or more other devices.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1A:
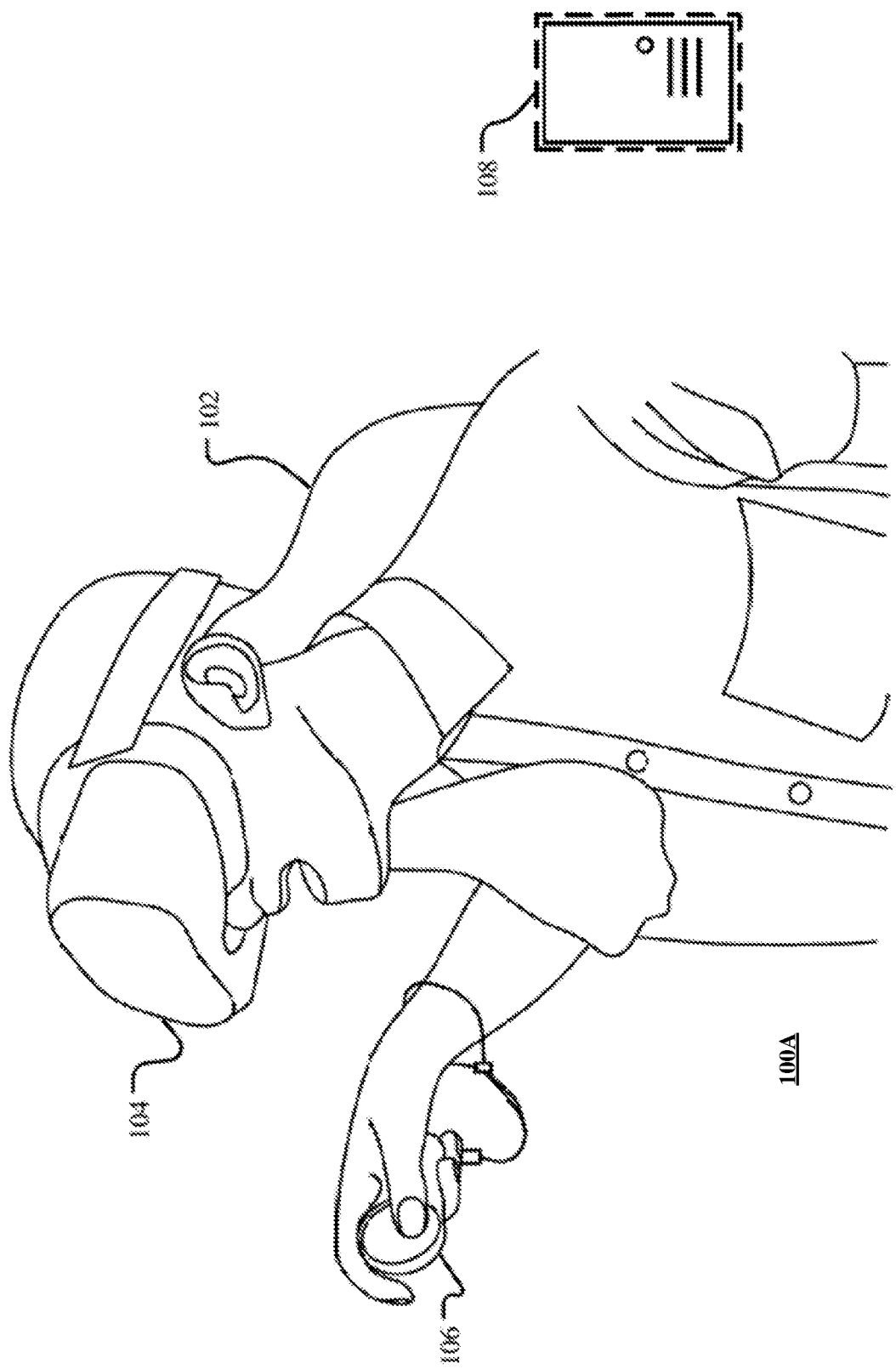
FIG. 1A illustrates an example artificial reality system and user.

FIG. 1A illustrates an example artificial reality system 100 and user 102. In particular embodiments, the artificial reality system 100 may comprise a headset 104, a controller 106, and a computing system 108. A user 102 may wear the headset 104 that may display visual artificial reality content to the user 102. The headset 104 may include an audio device that may provide audio artificial reality content to the user 102. The headset 104 may include an eye tracking system to determine a vergence distance of the user 102. A vergence distance may be a distance from the user's eyes to objects (e.g., real-world objects or virtual objects in a virtual space) that the user's eyes are converged at. The headset 104 may be referred to as a head-mounted display (HMD). One or more controllers 106 may be paired with the artificial reality system 100. In particular embodiments one or more controllers 106 may be equipped with at least one inertial measurement units (IMUs) and infrared (IR) light emitting diodes (LEDs) for the artificial reality system 100 to estimate a pose of the controller and/or to track a location of the controller, such that the user 102 may perform certain functions via the controller 106. In particular embodiments the one or more controllers 106 may be equipped with one or more trackable markers distributed to be tracked by the computing system 108. The one or more controllers 106 may comprise a trackpad and one or more buttons. The one or more controllers 106 may receive inputs from the user 102 and relay the inputs to the computing system 108. The one or more controllers 106 may also provide haptic feedback to the user 102. The computing system 108 may be connected to the headset 104 and the one or more controllers 106 through cables or wireless connections. The one or more controllers 106 may include a combination of hardware, software, and/or firmware not explicitly shown herein so as not to obscure other aspects of the disclosure.

Figure 1B:
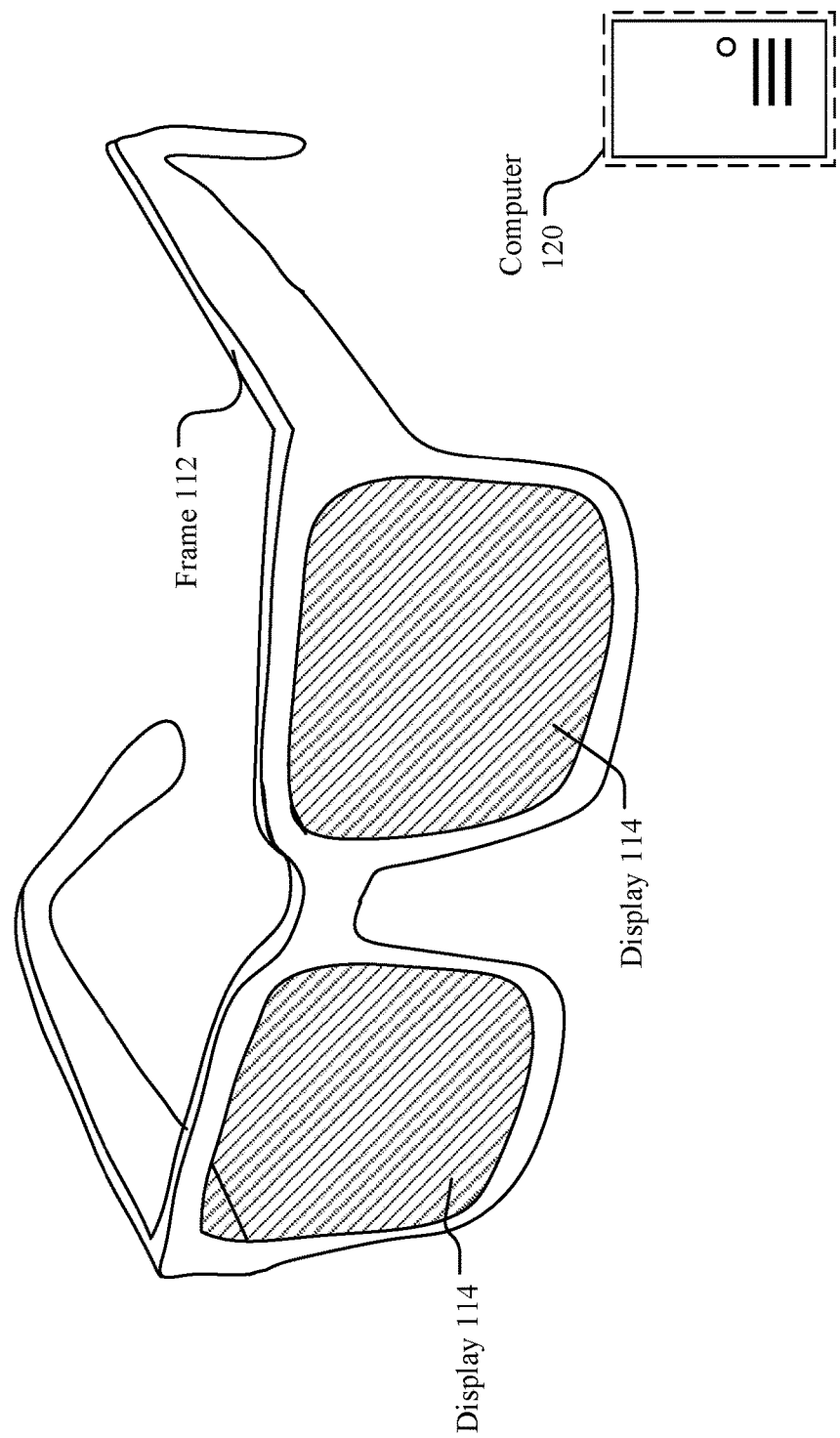
FIG. 1B illustrates an example augmented reality system.

FIG. 1B illustrates an example augmented reality system 100B. The augmented reality system 100B may include a head-mounted display (HMD) 110 (e.g., glasses) comprising a frame 112, one or more displays 114, and a computing system 120. The displays 114 may be transparent or translucent allowing a user wearing the HMD 110 to look through the displays 114 to see the real world and displaying visual artificial reality content to the user at the same time. The HMD 110 may include an audio device that may provide audio artificial reality content to users. The HMD 110 may include one or more cameras which can capture images and videos of environments. The HMD 110 may include an eye tracking system to track the vergence movement of the user wearing the HMD 110. The augmented reality system 100B may further include a controller comprising a trackpad and one or more buttons. The controller may receive inputs from users and relay the inputs to the computing system 120. The controller may also provide haptic feedback to users. The computing system 120 may be connected to the HMD 110 and the controller through cables or wireless connections. The computing system 120 may control the HMD 110 and the controller to provide the augmented reality content to and receive inputs from users. The computing system 120 may be a standalone host computer system, an on-board computer system integrated with the HMD 110, a mobile device, or any other hardware platform capable of providing artificial reality content to and receiving inputs from users.

Users of artificial reality systems often wish to traverse and experience areas beyond a particular room or area, for example and not by way of limitation, moving throughout rooms or floors of a particular building, leaving the building and walking down a particular street, exploring a public space (e.g., a public park), or visiting another user's space (e.g., a second user's living room). As a user moves throughout these spaces, artificial reality systems must provide synchronized, continuous, and updated feature maps with low latency in order to provide a high quality, immersive, and enjoyable experience for users. Traditional systems provide, index, and update one or more reconstructed three-dimensional (3D) maps that corresponds to the area the user is experiencing (e.g., a user's home, street, or public area). These maps are often stored locally (e.g., on the user's artificial-reality device) or through the cloud.

One way to update and maintain the accuracy of 3D maps for a particular area is to share and crowdsource 3D map data among users of an artificial reality system. This 3D map data may comprise one or more feature descriptors that can be used to identify, locate, and differentiate one or more features in an environment, for example and not by way of limitation an object or a particular area of an object (e.g., a corner or edge). Feature descriptors can also be utilized for tracking an environment as a user or artificial-reality device moves through the space, for example by localizing the user or an artificial-reality device in the environment, or by tracking one or more features in an environment (e.g., an object) as the user or an artificial-reality device moves throughout the environment. Generally, more feature descriptors for a particular environment provides a larger model that results in more accurate tracking in an environment. Feature descriptors may include varying levels of detail (e.g., precision, accuracy, etc.). More robust and detailed feature descriptors may be able to permit more accurate functionality (e.g., identification, tracking, etc.) and thus a more-immersive artificial reality experience despite challenging environmental conditions (e.g., low lighting, less texture) or changes to viewing angles that may alter the appearance of the environment.

By sharing and crowdsourcing feature descriptors for a particular 3D map, the artificial reality experience can be improved by, for example, reducing the time required for tracking, and improving tracking accuracy due to a greater quantity of feature descriptors for a particular 3D map. However, a challenge faced when sharing and crowdsourcing 3D map data is the heterogenous nature of the many artificial-reality devices that may be used to generate map data (e.g., feature descriptors) and experience artificial reality. For example, a computing system associated with a high-performant artificial reality device (e.g., a state-of-the-art device with optimal or near-optimal computing components and capabilities) may generate feature descriptors with high detail (e.g., accuracy, precision, etc.) which may result in a larger size of each feature descriptor. Using high detail feature descriptors in conjunction with a computing system associated with a high-performant artificial reality device may result in an optimal artificial reality experience for the user of the high-performant artificial-reality device. However, if these high detail feature descriptors were to be shared with and utilized by a computing system associated with a less-performant artificial reality device (e.g., a device with sub-optimal components and capabilities relative to the high-performant device), these high detail feature descriptors may strain the computing resources of a less-performant device, resulting in a sub-optimal artificial reality experience due to latency or other rendering issues. As another example, a computing system associated with a less-performant artificial reality device may generate feature descriptors with lower detail (e.g., accuracy, precision, etc.) relative to the high detail feature descriptors. Using lower detail feature descriptors in conjunction with a less-performant artificial reality device may result in an optimal artificial reality experience for the user of the less-performant artificial-reality device. However, if these lower detail feature descriptors were to be shared with and utilized by a relatively higher-performant artificial reality device (or even a second less-performant artificial-reality device with greater capabilities than the computing system associated with the less-performant artificial reality device that generated the low detail feature descriptors), these lower detail feature descriptors may under-utilize the capabilities of high-performant artificial-reality devices and result in a less-immersive artificial reality experience. Accordingly, there is an interest in generating and sharing feature descriptors across heterogenous devices without reducing the artificial reality experience for the user.

Privacy is also an important consideration when sharing 3D map data among users. For example, users could simply directly share image data of real environments with one another, which would allow each artificial-reality device to process the image and generate 3D map data (e.g., feature descriptors) that is particularized for the capabilities of the particular device. Yet such an approach would compromise privacy by requiring sharing and storing personalized image data with other users. For example, users may prefer not to share images that are captured while they experience an environment, which may permit others to ascertain the location of the user. As another example, a user may prefer not to share images of their bedroom, bathroom, or other private areas of their home. Accordingly, there is a need to share map data amongst users without sharing and storing personalized data, such as images.

Disclosed methods permit computing systems associated with artificial-reality devices to generate and share feature descriptors using sensor data captured by the artificial-reality device. These feature descriptors may be lossless (e.g., raw) feature descriptors. Using these feature descriptors, the artificial-reality device can generate a second feature descriptor with relative lower detail that is particular to the capabilities of a particular artificial-reality device (e.g., high detail feature descriptors for a high-performant artificial-reality device, lower detail feature descriptors for a less-performant artificial-reality device, etc.). The generated second feature descriptors can then be utilized by the artificial-reality device for various functionality, for example and not by way of limitation, map localization and tracking. The artificial-reality device can also share the first feature descriptors other devices, for example a second artificial reality device or a server, which can then generate and store, based on the first feature descriptors, other sets of feature descriptors for a variety of performant devices (e.g., high detail feature descriptors for a high-performant artificial-reality device, lower detail feature descriptors for a lesser-performant artificial-reality device, etc.). This technique permits every artificial-reality device, regardless of capability, to generate and share feature descriptors, while simultaneously providing device-specific feature descriptors that can be used for localization and tracking by the particular artificial-reality device, thus optimizing the capabilities of a particular artificial-reality device.

It should be appreciated that, for readability and clarity purposes of this disclosure, the terms high-performant device and less-performant device are intended only to indicate capabilities of the devices relative to one another, based on, for example, the computing components and resources of the artificial reality device (e.g., processing capabilities, memory, storage, battery capacity, etc.). For example, a laptop may be considered a high-performant device relative to a less-performant device such as a smartphone, a smartphone may be considered a high-performant device relative to a less-performant device such as a smartwatch, or a current-generation smartphone may be considered a high-performant device relative to a less-performant device such as a previous generation smartphone. For readability and clarity, this disclosure refers to "high-performant" and "less-performant" only to compare the relative components and capabilities of two or more computing systems or devices.

It should also be appreciated that, for readability and clarity purposes of this disclosure, the terms high detail feature descriptor and lower detail feature descriptors are intended only to compare the relative properties of one feature descriptor to another, based on, for example, the accuracy, size, data type, precision, or other qualities of a particular feature descriptor relative to another feature descriptor. For example, a high detail feature descriptor may be a feature descriptor with 128 dimensions and float 32 data type which is stored with 512 bytes (e.g., an SOSNet descriptor), whereas a lower-detail feature descriptor may be a feature descriptor with 32 dimensions and binary data type which is stored with 32 bytes (e.g., an ORB or FREAK descriptor). Although this example pertains to data size, this disclosure contemplates using "high detail" and "lower detail" to compare any property of a feature descriptor relative to another feature descriptor that may improve the performance of the artificial reality system (e.g., improve tracking accuracy, reduce localization time, provide better support for challenging environmental conditions, etc.). It should further be appreciated that a lossless feature descriptor contains sufficient detail to permit an originally generated feature descriptor to be reconstructed without any loss in fidelity. In this disclosure, any feature descriptor that is not lossless is considered to be a lower detail feature descriptor relative to a lossless feature descriptor, regardless of any other characteristics or properties.

Figure 2:
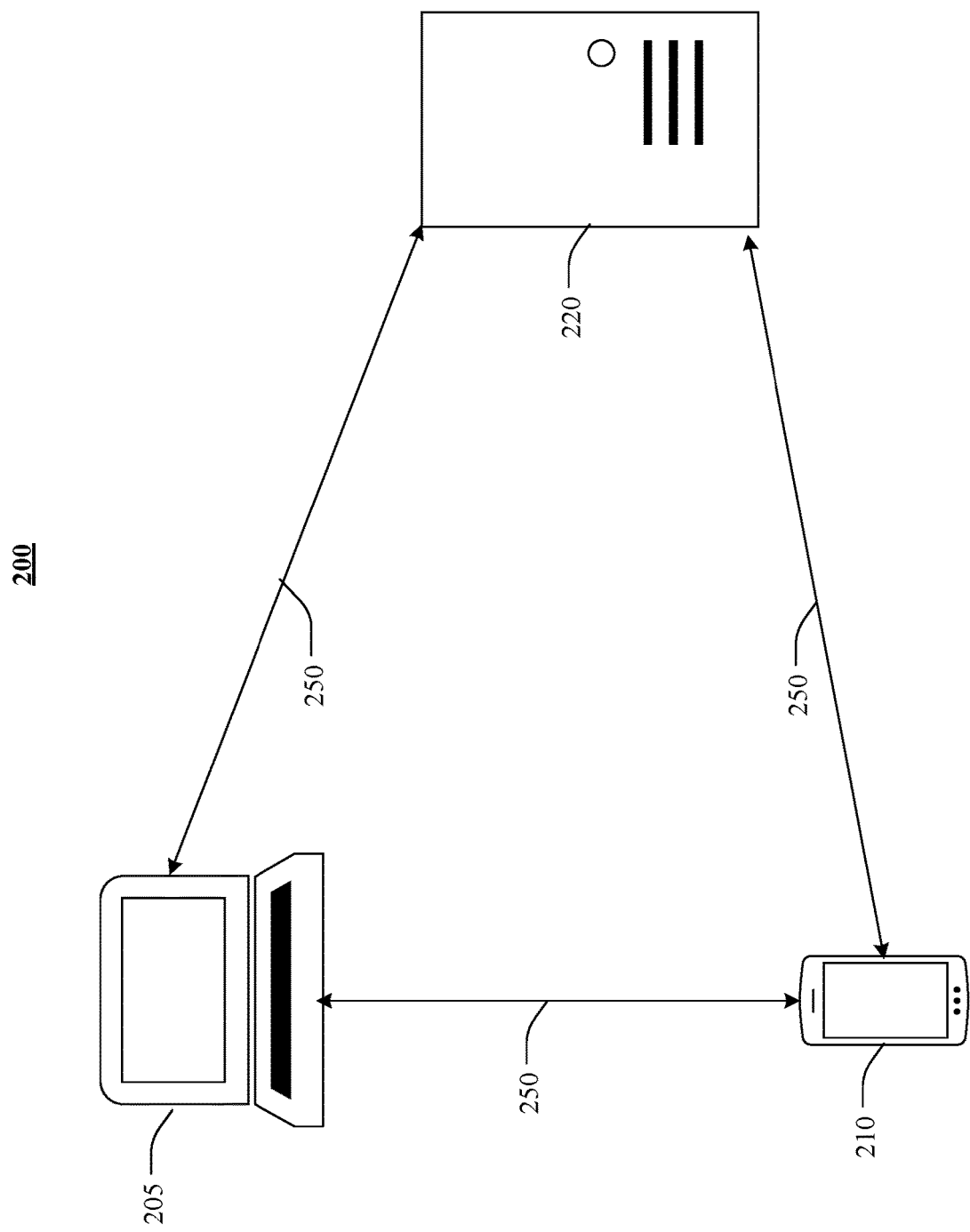
FIG. 2 illustrates an example environment for sharing map data between heterogenous computing systems or devices.

FIG. 2 illustrates an example environment for sharing 3D map data between heterogenous computing systems or devices. For example, laptop 205 may be a computing system associated with a high-performant artificial reality device, and smartphone 210 may be a computing system associated with a less-performant artificial reality device. The environment 200 permits heterogeneous devices to share 3D map data, such as feature descriptors, with one another. For example, in particular embodiments laptop 205 may generate 3D map data based on collected sensor data, and directly share the 3D map data with smartphone 210 via more or more links 250. As another example, in some embodiments laptop 205 may generate 3D map data based on collected sensor data, and transmit the 3D map data to server 220. Other devices, for example smartphone 210, can then receive the 3D map data from server 220.

In particular embodiments, the feature descriptors may be generated and shared by one or more components (e.g., CPU, GPU, etc.) of a computing system associated with a device (e.g., a laptop, a cellphone, a desktop, a wearable device). In particular embodiments, the device is in communication with a computing system on the HMD but may be otherwise physically separated from the HMD. As an example and not by way of limitation, this device may be laptop 205 or smartphone 210 that is wired to the HMD or communicates wirelessly with the HMD. As another example and not by way of limitation, the device may be a wearable (e.g., a device strapped to a wrist), handheld device (e.g., a phone), or some other suitable device (e.g., a laptop, a tablet, a desktop) that is wired to the HMD or communicates wirelessly with the HMD. As another example and not by way of limitation, feature descriptors may be generated and shared by an onboard computing system of an HMD.

Links 250 may connect one or more computing systems (e.g., laptop 205, smartphone 210, server 220, etc.) to each other. This disclosure contemplates any suitable links 250. In particular embodiments, one or more links 250 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 250 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 250, or a combination of two or more such links 250. Links 250 need not necessarily be the same throughout environment 200. One or more first links 250 may differ in one or more respects from one or more second links 250.

Figure 3A:
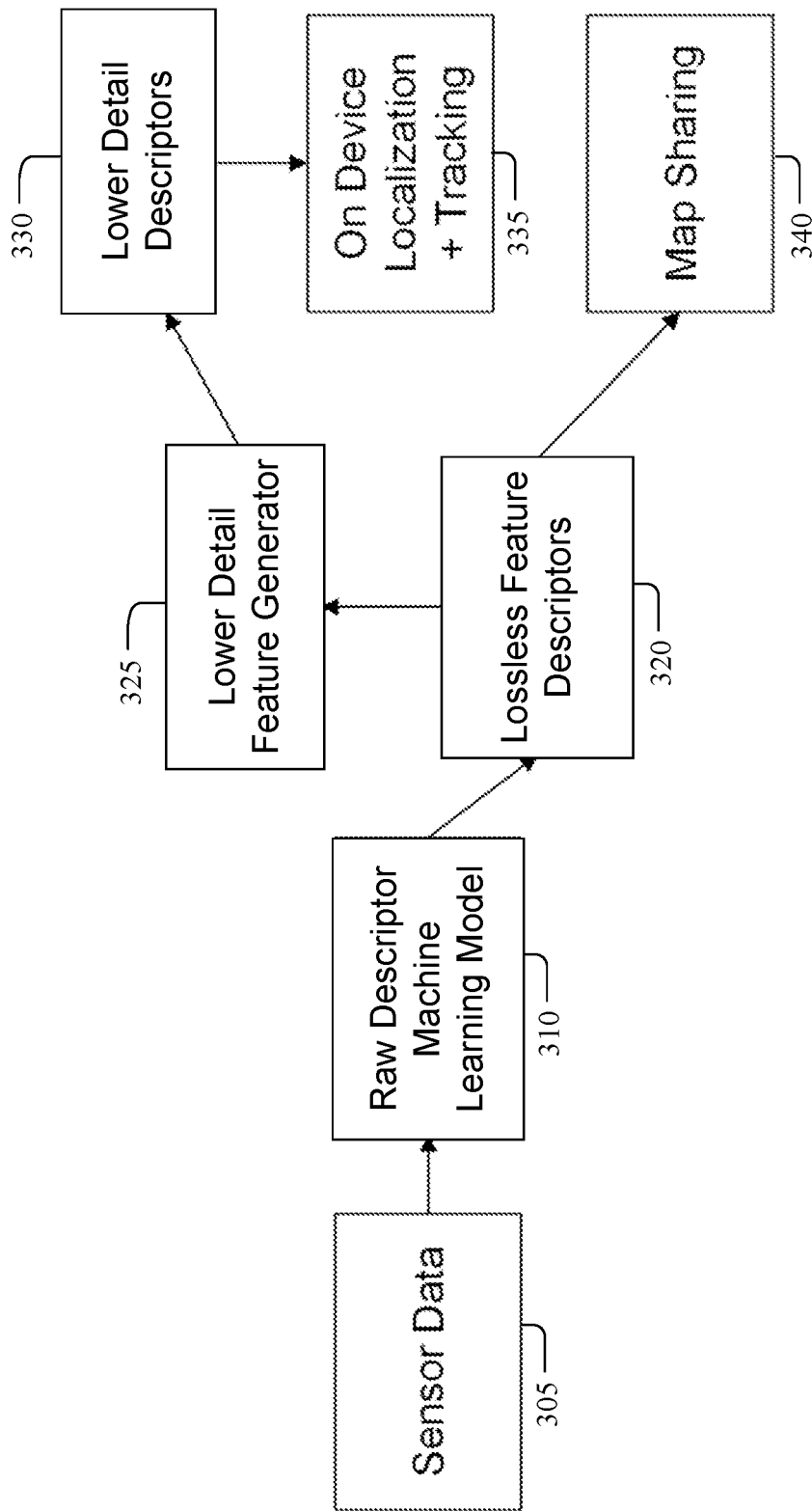
FIG. 3A illustrates example processes that may be used on an artificial-reality device to generate, share, and utilize feature descriptors of an environment.

FIG. 3A illustrates example processes that may be used on an artificial-reality device to generate, share, and utilize feature descriptors of an environment. The computing system associated with an artificial reality device may access sensor data 305, for example image data, depth data, LIDAR, etc., of a real environment that has been captured by one or more sensors or cameras associated with an artificial reality device. In particular embodiments the computing system associated with the artificial reality device may continuously access sensor data as a user or device moves through an environment.

In particular embodiments the sensor data 305 may be inputted into a machine learning model 310 stored on the computing system associated with the artificial reality device. Machine learning model 310 may be used to generate feature descriptors from sensor data 305, and may alternatively be referred to as a lossless (e.g., raw) feature descriptor machine learning model. In particular embodiments machine learning model 310 may be common to a plurality of heterogenous artificial reality devices. For example, returning to FIG. 2, high-performant laptop 205 and less-performant smartphone 210 may both store and utilize machine learning model 310 to generate feature descriptors from captured sensor data.

Figure 3B:
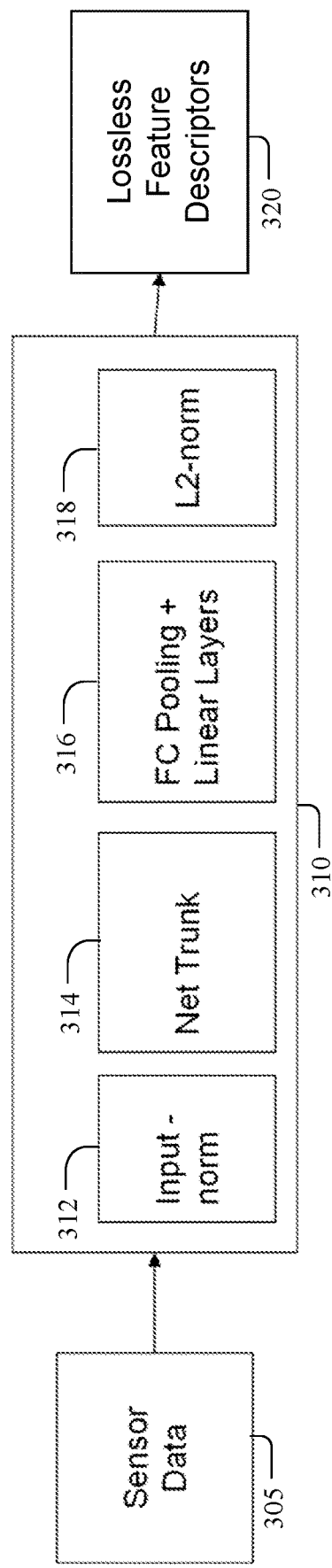
FIG. 3B illustrates an example architecture of a machine-learning model that may be utilized to generate feature descriptors of an environment.

FIG. 3B illustrates an example architecture of a machine-learning model that may be utilized to generate feature descriptors of an environment. The machine-learning model 310 is configured to take sensor data 305, for example an image captured by a camera worn by the user of an artificial reality device and output one or more feature descriptors 320. The machine-learning model's 310 architecture is designed to be compact (thereby reducing storage and memory needs) and with reduced complexities (thereby reducing processing needs) so that it may produce sufficiently accurate and fast results on devices with limited resources to meet the demands of real-time applications.

In particular embodiments machine-learning model 310 may comprise several high-level components, including an input normalization module 312, backbone neural network 314, also referred to as a trunk, fully connected (FC) pooling and linear layers 316, and L2 normalization module 318. Each of these components may be configured as a neural network, such that the machine learning model 310 comprises one or more neural networks. Conceptually, in the architecture shown, the trunk 314 is configured to process sensor data 305 and output one or more feature descriptors 320. In particular embodiments, the input normalization module 312, trunk 314, FC pooling and linear layers 316 and L2 normalization module 318 may perform their respective operations in parallel. In other embodiments, the input normalization module 312, trunk 314, FC pooling and linear layers 316, and L2 normalization module 318 may not perform their operations in parallel but instead adopt a multi-staged processing approach, which has the advantage of reducing computation and speeding up the overall operation. As described, the machine-learning model 310 according to particular embodiments is compact and optimized for inference-time speed.

Returning to FIG. 3A, machine learning model 310 may generate one or more lossless (e.g., raw) feature descriptors 320 based on the inputted sensor data 305. In particular embodiments these lossless feature descriptors 320 may be stored on the artificial reality device. Storing lossless feature descriptors generated by a particular computing system associated with the artificial reality device locally permits fast and efficient access without the need to receive map data from another computing system. This provides an advantage because the computing system associated with the artificial reality device that generated the lossless feature descriptors may be more likely to revisit the areas of the real environment where the corresponding sensor data was captured. In particular embodiments, lossless feature descriptors 320 can be shared with one or more other heterogenous artificial reality devices, for example a less-performant artificial reality device, through one or more map sharing processes 340.

In particular embodiments lossless feature descriptors 320 may be utilized by a lower detail feature generator 325 to generate lower-detail feature descriptors 330. It should be appreciated that lower-detail feature descriptors 330 are only intended to indicate the feature descriptors outputted by lower detail feature generator 325 have less detail than lossless feature descriptors 320. In particular embodiments lower detail feature generator 325 may be specific to the capabilities of the device. In this way, device-specific machine learning model and generated lower-detail feature descriptors 330 may differ across heterogenous artificial reality devices. For example, returning to FIG. 2, for high-performant laptop 205, lower detail feature generator 325 may be a high detail machine learning model that generates high detail feature descriptors using one or more lossless feature descriptors 320 as input. As another example, for less-performant smartphone 210, lower detail feature generator 325 may be a lower-detail machine learning model that generates lower detail feature descriptors using the one or more lossless feature descriptors 320 as input. In this way, lower detail feature generator 325 may be specific to the particular computing system associated with the artificial reality device.

For example, in some embodiments lower detail feature generator 325 may be a second machine learning model stored on the computing system associated with the artificial reality device. Although not depicted, the second machine learning model may comprise similar high-level components to machine learning model 310 as depicted in FIG. 3B. The second machine learning model may differ for each heterogeneous computing system and be specific to the capabilities of the artificial reality device. Alternatively, in some embodiments lower detail feature generator 325 may be one or more additional components of machine learning model 310, for example and not by way of limitation, an additional trunk of the first machine learning model 310. In this manner, the one or more additional components of machine learning model 310 may be device-specific and configured as a neural network. Conceptually, the one or more additional components are configured to process lossless feature descriptors 320 and output one or more lower-detail feature descriptors 330. In other non-limiting embodiments, lower detail feature generator 325 may comprise an algorithm that converts lossless feature descriptors 320 to lower-detail feature descriptors 330 without the use of a machine learning model. For example, a lossless feature descriptor 320 may have 64-byte precision, but a less performant device might require less-detail feature descriptors with only 32-byte precision. The lower detail feature generator 325 may comprise an algorithm that quantizes the 64 bytes data into 32 bytes.

Returning to FIG. 3A, lower detail feature descriptors 330 may be utilized by the computing system associated with a first artificial-reality device for various processes, for example map localization and tracking 335, to improve the artificial reality experience for a user of the device. For example, the lower detail feature descriptors 330 may be utilized to improve the accuracy, detail, precision, and localization times for a particular map or map area as the user of the artificial reality devices experiences the artificial reality environment. In particular embodiments these lower detail feature descriptors 330 may be used by the computing system associated with the artificial reality device to track the real environment. For example, the computing system may use the lower detail feature descriptors 330 and/or depth-sensing technology (e.g., a Simultaneous Localization and Mapping or SLAM algorithm) to detect and identify objects (e.g., vehicles, buildings, etc.) in the real environment, depth-sensing technology may be used to identify objects in the real-world scene to create a more accurate and immersive scene. In particular embodiments the lower detail feature descriptors 330 can be further used to place and improve the integration of virtual objects in the artificial reality environment relative to one or more objects in the real environment. For example, the lower detail feature descriptors 330 may be used to track objects of interest in the real environment, using for example, various tracking algorithms. This provides a more realistic and immersive display of the artificial reality environment.

Figure 4:
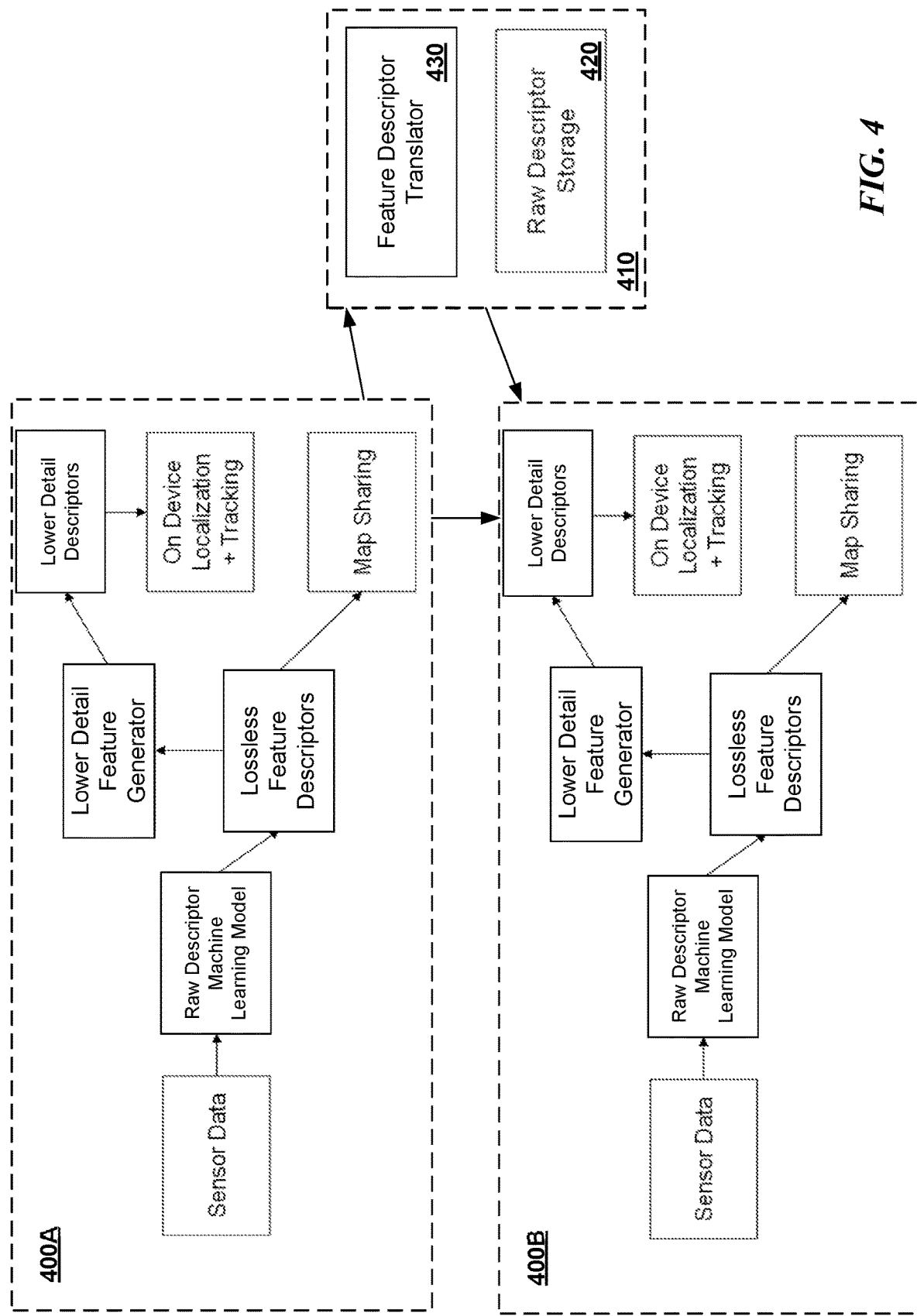
FIG. 4 illustrates a sample process for sharing map data between heterogenous computing systems or devices.

FIG. 4 illustrates a sample process for sharing map data between heterogenous computing systems or devices. In particular embodiments artificial reality devices 400A and 400B may represent independent computing system associated with an artificial reality device utilizing the example processes described in FIG. 3A to generate, share, and utilize feature descriptors of an environment. In particular embodiments devices 400A and 400B may be heterogenous relative to one another. For example, in particular embodiments device 400A may be a high-performant device and computing system 400B may be a less-performant device. As another example, in particular embodiments computing system 400B may be a high-performant artificial reality device and computing system 400A may be a less-performant artificial reality device. Although FIG. 4 and the remainder of this disclosure illustrates device 400A transmitting map data to device 400B and/or server 410, it should be appreciated that in particular embodiments a computing system associated with device 400B can transmit map data to device 400A and/or server 410. Although not depicted, it should also be appreciated that in particular embodiments a computing system associated with device 400A and a computing system associated with device 400B can simultaneously generate and share map data with each other.

In particular embodiments a computing system associated with device 400A may share one or more lossless feature descriptors 320 directly with device 400B. For example, as illustrated in FIG. 4, lossless feature descriptors generated by a computing system associated with device 400A can be transmitted directly to computing system 400B. In particular embodiments, a computing system associated with the device that receives the lossless feature descriptors (e.g., device 400B) can subsequently generate less-detailed feature descriptors using for example, the device-specific machine learning model stored on the particular device. The resulting lower detail feature descriptors generated from the shared lossless feature descriptors can be used with other feature descriptors generated on the particular device localization and tracking. An advantage of sharing feature descriptors directly, for example between devices 400A and 400B without server 410, may be the reduced time required to transmit and share feature descriptors. For example, devices 400A and 400B may be in geographic proximity to each other, whereas server 410 may be at a greater geographic distance between device 400A and/or device 400B. This reduced proximity may reduce the time required to transmit feature descriptors between two or more artificial reality devices.

In particular embodiments the computing system associated with device 400A may share one or more lossless feature descriptors 320 with device 400B through one or more other computing systems or devices, for example server 410. For example, lossless feature descriptors generated by a computing system associated with device 400A can be transmitted to server 410. Server 410 may comprise feature descriptor storage 420, which may be used to store lossless feature descriptors received from a plurality of devices. In this way, server 410 may receive and host lossless feature descriptors transmitted from a plurality of devices for a plurality of map areas. Server 410 may further comprise feature descriptor translator 430. Feature descriptor translator 430 may comprise different machine learning models which can receive lossless feature descriptors on storage 420 as input and generate one or more lower-detail feature descriptors. In this manner, feature descriptor translator 430 can generate feature descriptors with different levels of detail for use by a plurality of heterogenous devices that may request the feature descriptors from server 410. As an example, if device 400B is a high-performant device, feature descriptor translator 430 may use stored lossless feature descriptors to generate high detail feature descriptors that can be used for various processes, for example device localization and tracking, on the high-performant device. As another example, if device 400B is a less-performant device, feature descriptor translator 430 may use stored lossless feature descriptors to generate lower detail feature descriptors that can be used for various purposes, for example device localization and tracking, on the less-performant device. The feature descriptors generated by feature descriptor translator 430 can be transmitted to an appropriate device (e.g., high-detail feature descriptors generated by translator 430 are shared with high-performant devices, lower detail descriptors generated by translator 430 are shared with less-performant devices, etc.) and used with feature descriptors generated by the computing system associated with the particular device for device localization and tracking. An advantage of sharing feature descriptors indirectly through server 410 is that the lossless feature descriptors can be translated to the appropriate level of detail for the particular device by server 410. This reduces power and resource requirements of device 400B, which may be a less-performant device (e.g., device 400B may be an HMD 110 with limited battery and computing power due to compactness of its components). Alternatively, server 410 may instead transmit one or more lossless feature descriptors stored on raw descriptor storage 420 to a particular device, for example device 400B. The computing system associated with the device that receives the lossless feature descriptors can subsequently generate lower detail feature descriptors using for example, the device-specific machine learning model stored on the particular device.

In particular embodiments sharing feature descriptors between devices may be initiated by a user of an artificial reality device. For example, when User B of device 400B enters the home of User A of device 400A, User A may want to share map data (e.g., feature descriptors) for that map area that were previously generated by the computing system associated with device 400A. Because of the private nature of the map area (e.g., a private residence), device 400B may have not previously visited the space, and device 400A may be the only system that has previously generated feature descriptors for the home of User A. Sharing these previously generated feature descriptors with User B may greatly enhance the artificial reality experience in the home of User A. In particular embodiments a computing system associated with a device (e.g., device 400A or device 400B) may generate and display on their respective user's artificial reality device a request to share map data between the two or more devices. In particular embodiments this request may be generated in response to sensor data or user data associated with device 400A or device 400B, for example and not by way of limitation, based on the current location of device 400B relative to the relevant geographic area (e.g., the home of User A), based on the current location of device 400A relative to device 400B, based on a previous or current connection of the device (e.g., device 400B is connected to a Wi-Fi network associated with the home of User A), or a connection between User A and User B on a social networking service. Upon receiving an indication that the user wishes to share map data (e.g., the user interacts with the request), the device may share feature descriptors with one or more other devices as described herein.

In particular embodiments sharing feature descriptors between devices for a particular map or map area may be initiated automatically (e.g., without user intervention) based on sensor or user data associated with an artificial reality device. For example, when device 400B approaches or enters an area for which feature descriptors are stored on a second device (e.g., device 400A or server 410), the second device may automatically transmit feature descriptors to device 400B associated with the artificial reality device. Sensor or user data may include a previous or current connection of the device, a credential provided to the device 400B to facilitate access, (e.g., the user account associated with device 400B receives ongoing access to map data generated by a computing system associated with another device), or based on a connection on a social networking service. Upon receiving an indication that the user wishes to share map data (e.g., the user interacts with the request), the computing system may share feature descriptors with one or more other devices as described herein.

Figure 5:
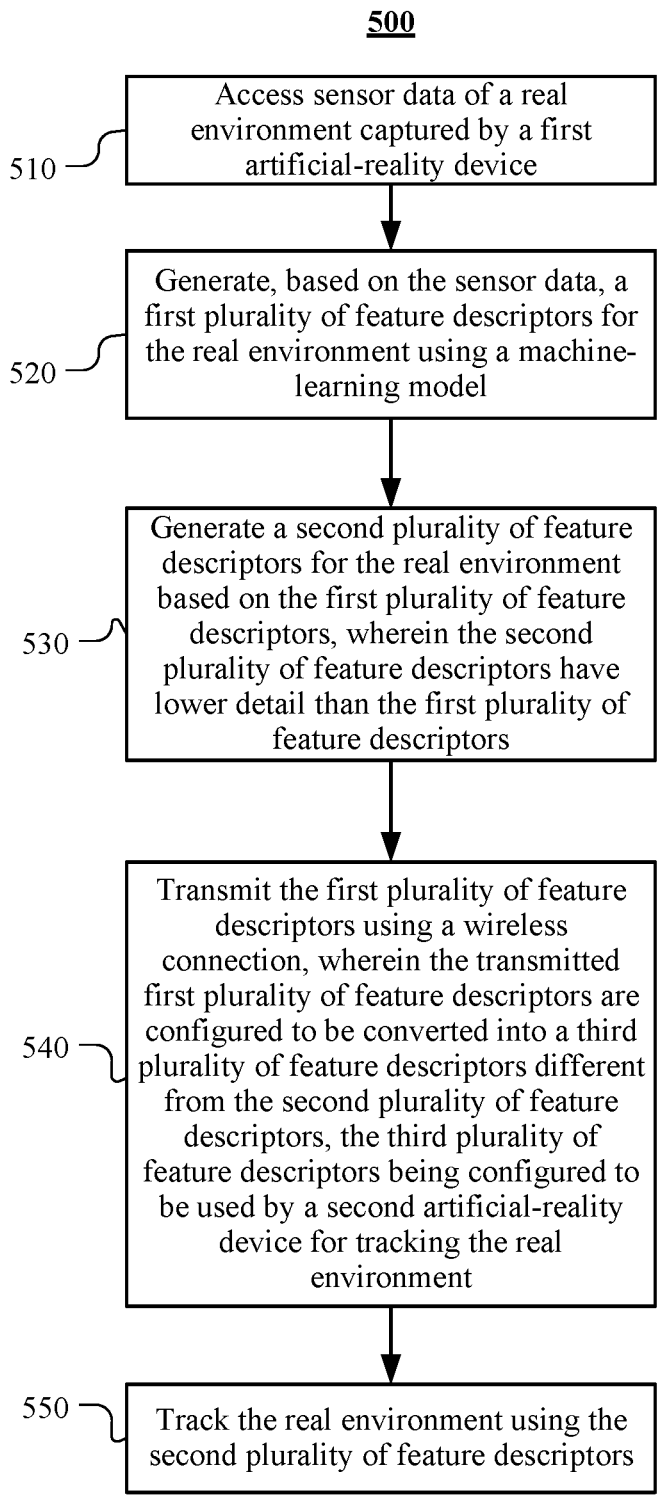
FIG. 5 illustrates an example method for sharing feature descriptors of three-dimensional maps between heterogeneous devices.

FIG. 5 illustrates an example method 500 for sharing feature descriptors of three-dimensional maps between heterogeneous devices. The method may begin at step 510, where a computing system associated with a first artificial-reality device may access sensor data of a real environment captured by the first artificial-reality device;

At step 520, the computing system associated with the first artificial reality device may generate, based on the sensor data, a first plurality of feature descriptors for the real environment using a machine-learning mode;

At step 530, the computing system associated with the first artificial reality device may generate a second plurality of feature descriptors for the real environment based on the first plurality of feature descriptors, wherein the second plurality of feature descriptors have lower detail than the first plurality of feature descriptors;

At step 530, the computing system associated with the first artificial reality device may transmit the first plurality of feature descriptors using a wireless connection, wherein the transmitted first plurality of feature descriptors are configured to be converted into a third plurality of feature descriptors different from the second plurality of feature descriptors, the third plurality of feature descriptors being configured to be used by a second artificial-reality device for tracking the real environment.

At step 550, the computing system associated with the first artificial reality device may track the real environment using the second plurality of feature descriptors.

Particular embodiments may repeat one or more steps of the method of FIG. 5, where appropriate. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates an example method for sharing feature descriptors of three-dimensional maps between heterogeneous devices, including the particular steps of the method of FIG. 5, this disclosure contemplates any suitable method for sharing feature descriptors of three-dimensional maps between heterogeneous devices, including any suitable steps, which may include all, some, or none of the steps of the method of FIG. 5, where appropriate. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

Figure 6:
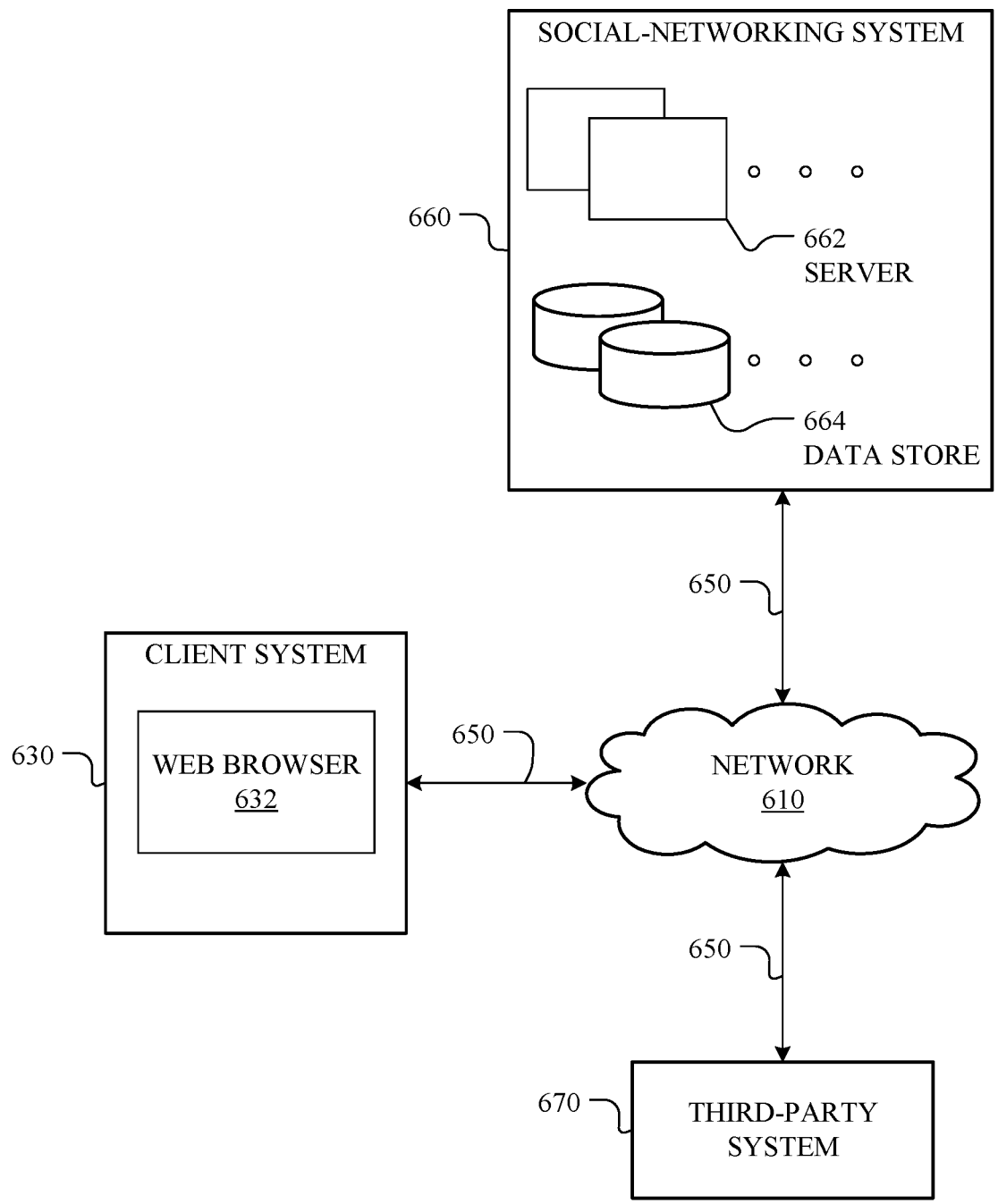
FIG. 6 illustrates an example network environment associated with a social-networking system.

FIG. 6 illustrates an example network environment 600 associated with a social-networking system. Network environment 600 includes a client system 630, a social-networking system 660, and a third-party system 670 connected to each other by a network 610. Although FIG. 6 illustrates a particular arrangement of client system 630, social-networking system 660, third-party system 670, and network 610, this disclosure contemplates any suitable arrangement of client system 630, social-networking system 660, third-party system 670, and network 610. As an example and not by way of limitation, two or more of client system 630, social-networking system 660, and third-party system 670 may be connected to each other directly, bypassing network 610. As another example, two or more of client system 630, social-networking system 660, and third-party system 670 may be physically or logically co-located with each other in whole or in part. Moreover, although FIG. 6 illustrates a particular number of client systems 630, social-networking systems 660, third-party systems 670, and networks 610, this disclosure contemplates any suitable number of client systems 630, social-networking systems 660, third-party systems 670, and networks 610. As an example and not by way of limitation, network environment 600 may include multiple client system 630, social-networking systems 660, third-party systems 670, and networks 610.

This disclosure contemplates any suitable network 610. As an example and not by way of limitation, one or more portions of network 610 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 610 may include one or more networks 610.

Links 650 may connect client system 630, social-networking system 660, and third-party system 670 to communication network 610 or to each other. This disclosure contemplates any suitable links 650. In particular embodiments, one or more links 650 include one or more wireline (such as for example Digital Subscriber Line (DSL) or Data Over Cable Service Interface Specification (DOC SIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 650 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 650, or a combination of two or more such links 650. Links 650 need not necessarily be the same throughout network environment 600. One or more first links 650 may differ in one or more respects from one or more second links 650.

In particular embodiments, client system 630 may be an electronic device including hardware, software, or embedded logic components or a combination of two or more such components and capable of carrying out the appropriate functionalities implemented or supported by client system 630. As an example and not by way of limitation, a client system 630 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 630. A client system 630 may enable a network user at client system 630 to access network 610. A client system 630 may enable its user to communicate with other users at other client systems 630.

In particular embodiments, client system 630 may include a web browser 632, and may have one or more add-ons, plug-ins, or other extensions. A user at client system 630 may enter a Uniform Resource Locator (URL) or other address directing the web browser 632 to a particular server (such as server 662, or a server associated with a third-party system 670), and the web browser 632 may generate a Hyper Text Transfer Protocol (HTTP) request and communicate the HTTP request to server. The server may accept the HTTP request and communicate to client system 630 one or more Hyper Text Markup Language (HTML) files responsive to the HTTP request. Client system 630 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts, combinations of markup language and scripts, and the like. Herein, reference to a webpage encompasses one or more corresponding webpage files (which a browser may use to render the webpage) and vice versa, where appropriate.

In particular embodiments, social-networking system 660 may be a network-addressable computing system that can host an online social network. Social-networking system 660 may generate, store, receive, and send social-networking data, such as, for example, user-profile data, concept-profile data, social-graph information, or other suitable data related to the online social network. Social-networking system 660 may be accessed by the other components of network environment 600 either directly or via network 610. As an example and not by way of limitation, client system 630 may access social-networking system 660 using a web browser 632, or a native application associated with social-networking system 660 (e.g., a mobile social-networking application, a messaging application, another suitable application, or any combination thereof) either directly or via network 610. In particular embodiments, social-networking system 660 may include one or more servers 662. Each server 662 may be a unitary server or a distributed server spanning multiple computers or multiple datacenters. Servers 662 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 662 may include hardware, software, or embedded logic components or a combination of two or more such components for carrying out the appropriate functionalities implemented or supported by server 662. In particular embodiments, social-networking system 660 may include one or more data stores 664. Data stores 664 may be used to store various types of information. In particular embodiments, the information stored in data stores 664 may be organized according to specific data structures. In particular embodiments, each data store 664 may be a relational, columnar, correlation, or other suitable database. Although this disclosure describes or illustrates particular types of databases, this disclosure contemplates any suitable types of databases. Particular embodiments may provide interfaces that enable a client system 630, a social-networking system 660, or a third-party system 670 to manage, retrieve, modify, add, or delete, the information stored in data store 664.

In particular embodiments, social-networking system 660 may store one or more social graphs in one or more data stores 664. In particular embodiments, a social graph may include multiple nodes—which may include multiple user nodes (each corresponding to a particular user) or multiple concept nodes (each corresponding to a particular concept)—and multiple edges connecting the nodes. Social-networking system 660 may provide users of the online social network the ability to communicate and interact with other users. In particular embodiments, users may join the online social network via social-networking system 660 and then add connections (e.g., relationships) to a number of other users of social-networking system 660 to whom they want to be connected. Herein, the term "friend" may refer to any other user of social-networking system 660 with whom a user has formed a connection, association, or relationship via social-networking system 660.

In particular embodiments, social-networking system 660 may provide users with the ability to take actions on various types of items or objects, supported by social-networking system 660. As an example and not by way of limitation, the items and objects may include groups or social networks to which users of social-networking system 660 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 660 or by an external system of third-party system 670, which is separate from social-networking system 660 and coupled to social-networking system 660 via a network 610.

In particular embodiments, social-networking system 660 may be capable of linking a variety of entities. As an example and not by way of limitation, social-networking system 660 may enable users to interact with each other as well as receive content from third-party systems 670 or other entities, or to allow users to interact with these entities through an application programming interfaces (API) or other communication channels.

In particular embodiments, a third-party system 670 may include one or more types of servers, one or more data stores, one or more interfaces, including but not limited to APIs, one or more web services, one or more content sources, one or more networks, or any other suitable components, e.g., that servers may communicate with. A third-party system 670 may be operated by a different entity from an entity operating social-networking system 660. In particular embodiments, however, social-networking system 660 and third-party systems 670 may operate in conjunction with each other to provide social-networking services to users of social-networking system 660 or third-party systems 670. In this sense, social-networking system 660 may provide a platform, or backbone, which other systems, such as third-party systems 670, may use to provide social-networking services and functionality to users across the Internet.

In particular embodiments, a third-party system 670 may include a third-party content object provider. A third-party content object provider may include one or more sources of content objects, which may be communicated to a client system 630. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 660 also includes user-generated content objects, which may enhance a user's interactions with social-networking system 660. User-generated content may include anything a user can add, upload, send, or "post" to social-networking system 660. As an example and not by way of limitation, a user communicates posts to social-networking system 660 from a client system 630. Posts may include data such as status updates or other textual data, location information, photos, videos, links, music or other similar data or media. Content may also be added to social-networking system 660 by a third-party through a "communication channel," such as a newsfeed or stream.

In particular embodiments, social-networking system 660 may include a variety of servers, sub-systems, programs, modules, logs, and data stores. In particular embodiments, social-networking system 660 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 660 may also include suitable components such as network interfaces, security mechanisms, load balancers, failover servers, management-and-network-operations consoles, other suitable components, or any suitable combination thereof. In particular embodiments, social-networking system 660 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 660 to one or more client systems 630 or one or more third-party system 670 via network 610. The web server may include a mail server or other messaging functionality for receiving and routing messages between social-networking system 660 and one or more client systems 630. An API-request server may allow a third-party system 670 to access information from social-networking system 660 by calling one or more APIs. An action logger may be used to receive communications from a web server about a user's actions on or off social-networking system 660. In conjunction with the action log, a third-party-content-object log may be maintained of user exposures to third-party-content objects. A notification controller may provide information regarding content objects to a client system 630. Information may be pushed to a client system 630 as notifications, or information may be pulled from client system 630 responsive to a request received from client system 630. Authorization servers may be used to enforce one or more privacy settings of the users of social-networking system 660. A privacy setting of a user determines how particular information associated with a user can be shared. The authorization server may allow users to opt in to or opt out of having their actions logged by social-networking system 660 or shared with other systems (e.g., third-party system 670), such as, for example, by setting appropriate privacy settings. Third-party-content-object stores may be used to store content objects received from third parties, such as a third-party system 670. Location stores may be used for storing location information received from client systems 630 associated with users. Advertisement-pricing modules may combine social information, the current time, location information, or other suitable information to provide relevant advertisements, in the form of notifications, to a user.

Figure 7:
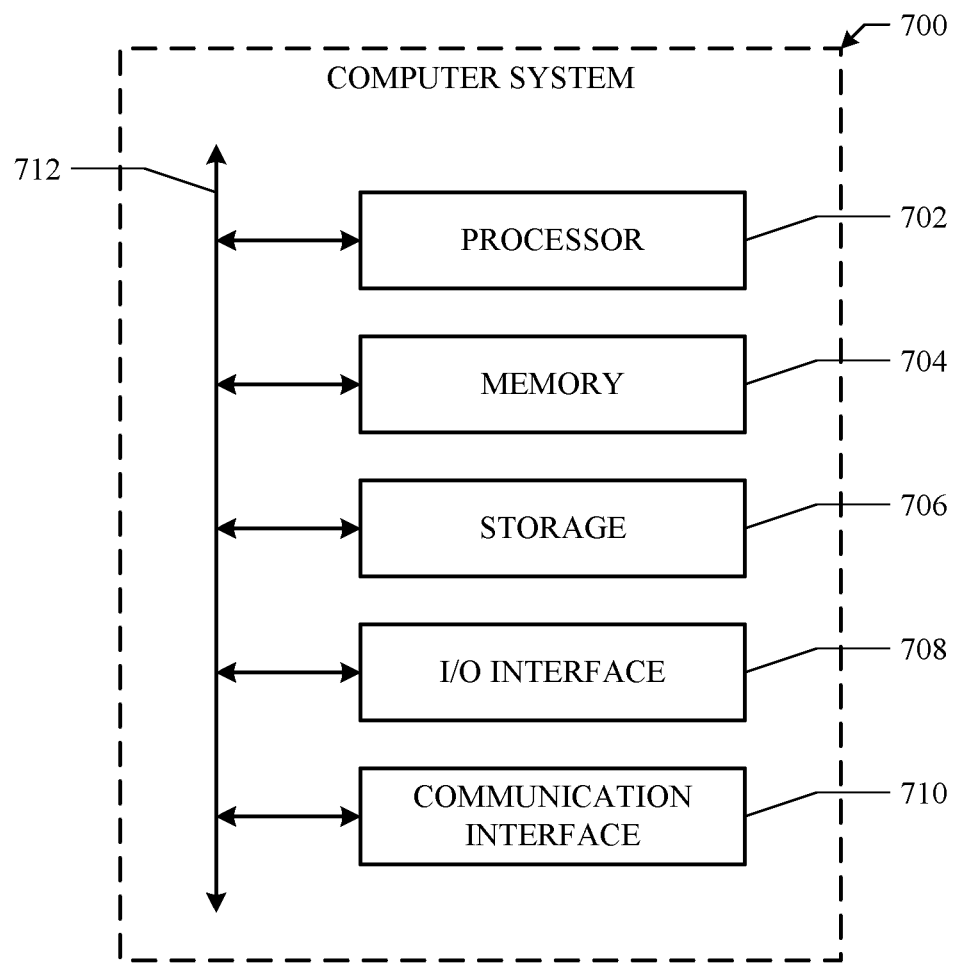
FIG. 7 illustrates an example computer system.

FIG. 7 illustrates an example computer system 700. In particular embodiments, one or more computer systems 700 perform one or more steps of one or more methods described or illustrated herein. In particular embodiments, one or more computer systems 700 provide functionality described or illustrated herein. In particular embodiments, software running on one or more computer systems 700 performs one or more steps of one or more methods described or illustrated herein or provides functionality described or illustrated herein. Particular embodiments include one or more portions of one or more computer systems 700. Herein, reference to a computer system may encompass a computing device, and vice versa, where appropriate. Moreover, reference to a computer system may encompass one or more computer systems, where appropriate.

This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 700 may include one or more computer systems 700; be unitary or distributed; span multiple locations; span multiple machines; span multiple data centers; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 702, memory 704, storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 702 includes hardware for executing instructions, such as those making up a computer program. As an example and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. This disclosure contemplates processor 702 including any suitable number of any suitable internal caches, where appropriate. As an example and not by way of limitation, processor 702 may include one or more instruction caches, one or more data caches, and one or more translation lookaside buffers (TLBs). Instructions in the instruction caches may be copies of instructions in memory 704 or storage 706, and the instruction caches may speed up retrieval of those instructions by processor 702. Data in the data caches may be copies of data in memory 704 or storage 706 for instructions executing at processor 702 to operate on; the results of previous instructions executed at processor 702 for access by subsequent instructions executing at processor 702 or for writing to memory 704 or storage 706; or other suitable data. The data caches may speed up read or write operations by processor 702. The TLBs may speed up virtual-address translation for processor 702. In particular embodiments, processor 702 may include one or more internal registers for data, instructions, or addresses. This disclosure contemplates processor 702 including any suitable number of any suitable internal registers, where appropriate. Where appropriate, processor 702 may include one or more arithmetic logic units (ALUs); be a multi-core processor; or include one or more processors 702. Although this disclosure describes and illustrates a particular processor, this disclosure contemplates any suitable processor.

In particular embodiments, memory 704 includes main memory for storing instructions for processor 702 to execute or data for processor 702 to operate on. As an example and not by way of limitation, computer system 700 may load instructions from storage 706 or another source (such as, for example, another computer system 700) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage 706 or elsewhere). One or more memory buses (which may each include an address bus and a data bus) may couple processor 702 to memory 704. Bus 712 may include one or more memory buses, as described below. In particular embodiments, one or more memory management units (MMUs) reside between processor 702 and memory 704 and facilitate accesses to memory 704 requested by processor 702. In particular embodiments, memory 704 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 704 may include one or more memories 704, where appropriate. Although this disclosure describes and illustrates particular memory, this disclosure contemplates any suitable memory.

In particular embodiments, storage 706 includes mass storage for data or instructions. As an example and not by way of limitation, storage 706 may include a hard disk drive (HDD), a floppy disk drive, flash memory, an optical disc, a magneto-optical disc, magnetic tape, or a Universal Serial Bus (USB) drive or a combination of two or more of these. Storage 706 may include removable or non-removable (or fixed) media, where appropriate. Storage 706 may be internal or external to computer system 700, where appropriate. In particular embodiments, storage 706 is non-volatile, solid-state memory. In particular embodiments, storage 706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 706 taking any suitable physical form. Storage 706 may include one or more storage control units facilitating communication between processor 702 and storage 706, where appropriate. Where appropriate, storage 706 may include one or more storages 706. Although this disclosure describes and illustrates particular storage, this disclosure contemplates any suitable storage.

In particular embodiments, I/O interface 708 includes hardware, software, or both, providing one or more interfaces for communication between computer system 700 and one or more I/O devices. Computer system 700 may include one or more of these I/O devices, where appropriate. One or more of these I/O devices may enable communication between a person and computer system 700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 708 for them. Where appropriate, I/O interface 708 may include one or more device or software drivers enabling processor 702 to drive one or more of these I/O devices. I/O interface 708 may include one or more I/O interfaces 708, where appropriate. Although this disclosure describes and illustrates a particular I/O interface, this disclosure contemplates any suitable I/O interface.

In particular embodiments, communication interface 710 includes hardware, software, or both providing one or more interfaces for communication (such as, for example, packet-based communication) between computer system 700 and one or more other computer systems 700 or one or more networks. As an example and not by way of limitation, communication interface 710 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 710 for it. As an example and not by way of limitation, computer system 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 700 may include any suitable communication interface 710 for any of these networks, where appropriate. Communication interface 710 may include one or more communication interfaces 710, where appropriate. Although this disclosure describes and illustrates a particular communication interface, this disclosure contemplates any suitable communication interface.

In particular embodiments, bus 712 includes hardware, software, or both coupling components of computer system 700 to each other. As an example and not by way of limitation, bus 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 712 may include one or more buses 712, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a computing system associated with a first device, wherein the first device is an artificial-reality device:
accessing sensor data of a real environment captured by the first device;
generating, based on the sensor data, a first plurality of feature descriptors for the real environment using a machine-learning model;
generating a second plurality of feature descriptors for the real environment based on the first plurality of feature descriptors, wherein the second plurality of feature descriptors have lower detail than the first plurality of feature descriptors;
transmitting the first plurality of feature descriptors using a wireless connection, wherein the transmitted first plurality of feature descriptors are configured to be converted into a third plurality of feature descriptors different from the second plurality of feature descriptors, the third plurality of feature descriptors being configured to be used by a second artificial-reality device for tracking the real environment; and
tracking the real environment using the second plurality of feature descriptors.

2. The method of claim 1, wherein the sensor data is an image of the real environment captured by a camera worn by a user of the first artificial-reality device.

3. The method of claim 1, wherein tracking the real environment using the second plurality of feature descriptors further comprises localizing the first artificial-reality device in the real environment.

4. The method of claim 1, wherein the first artificial-reality device is a high-performant device relative to the second artificial-reality device, wherein the second plurality of feature descriptors have higher detail relative to the third plurality of feature descriptors.

5. The method of claim 1, wherein the first artificial-reality device is a less-performant device relative to the second artificial-reality device, wherein the second plurality of feature descriptors have less detail relative to the third plurality of feature descriptors.

6. The method of claim 1, wherein the first plurality of feature descriptors are transmitted to a server configured to convert the first plurality of feature descriptors into the third plurality of feature descriptors and transmit the third plurality of feature descriptors to the second artificial reality device.

7. The method of claim 1, wherein the first plurality of feature descriptors are transmitted to the second artificial reality device, the second artificial reality device being configured to convert the first plurality of feature descriptors into the third plurality of feature descriptors.

8. The method of claim 1, wherein the second plurality of feature descriptors are generated by a second machine learning model stored on the first artificial reality device.

9. The method of claim 1, wherein the first plurality of feature descriptors are lossless feature descriptors.

10. One or more computer-readable non-transitory storage media embodying software that is operable when executed to:
access sensor data of a real environment captured by the first device;
generate, based on the sensor data, a first plurality of feature descriptors for the real environment using a machine-learning model;
generate a second plurality of feature descriptors for the real environment based on the first plurality of feature descriptors, wherein the second plurality of feature descriptors have lower detail than the first plurality of feature descriptors;
transmit the first plurality of feature descriptors using a wireless connection, wherein the transmitted first plurality of feature descriptors are configured to be converted into a third plurality of feature descriptors different from the second plurality of feature descriptors, the third plurality of feature descriptors being configured to be used by a second artificial-reality device for tracking the real environment; and
track the real environment using the second plurality of feature descriptors.

11. The media of claim 10, wherein the sensor data is an image of the real environment captured by a camera worn by a user of the first artificial-reality device.

12. The media of claim 10, wherein the first plurality of feature descriptors are transmitted to a server configured to convert the first plurality of feature descriptors into the third plurality of feature descriptors and transmit the third plurality of feature descriptors to the second artificial reality device.

13. The media of claim 10, wherein the first plurality of feature descriptors are transmitted to the second artificial reality device, the second artificial reality device being configured to convert the first plurality of feature descriptors into the third plurality of feature descriptors.

14. The media of claim 10, wherein the first artificial-reality device is a high-performant device relative to the second artificial-reality device, wherein the second plurality of feature descriptors have higher detail relative to the third plurality of feature descriptors.

15. The media of claim 10, wherein the second plurality of feature descriptors are generated by a second machine learning model stored on the first artificial reality device.

16. A system comprising:
one or more processors; and
one or more computer-readable non-transitory storage media coupled to one or more of the processors and comprising instructions operable when executed by one or more of the processors to cause the system to:
access sensor data of a real environment captured by the first device;
generate, based on the sensor data, a first plurality of feature descriptors for the real environment using a machine-learning model;

generate a second plurality of feature descriptors for the real environment based on the first plurality of feature descriptors, wherein the second plurality of feature descriptors have lower detail than the first plurality of feature descriptors;

transmit the first plurality of feature descriptors using a wireless connection, wherein the transmitted first plurality of feature descriptors are configured to be converted into a third plurality of feature descriptors different from the second plurality of feature descriptors, the third plurality of feature descriptors being configured to be used by a second artificial-reality device for tracking the real environment; and track the real environment using the second plurality of feature descriptors.

17. The system of claim 16, wherein the sensor data is an image of the real environment captured by a camera worn by a user of the first artificial-reality device.

18. The system of claim 16, wherein the first plurality of feature descriptors are transmitted to a server configured to convert the first plurality of feature descriptors into the third plurality of feature descriptors and transmit the third plurality of feature descriptors to the second artificial reality device.

19. The system of claim 16, wherein the first plurality of feature descriptors are transmitted to the second artificial reality device, the second artificial reality device being configured to convert the first plurality of feature descriptors into the third plurality of feature descriptors.

20. The system of claim 16, wherein the first artificial-reality device is a high-performant device relative to the second artificial-reality device, wherein the second plurality of feature descriptors have higher detail relative to the third plurality of feature descriptors.

* * * * *